United States Patent [19]

Miller et al.

[11] Patent Number: 4,684,867
[45] Date of Patent: Aug. 4, 1987

[54] REGENERATIVE UNIPOLAR CONVERTER FOR SWITCHED RELUCTANCE MOTORS USING ONE MAIN SWITCHING DEVICE PER PHASE

[75] Inventors: Timothy J. E. Miller, Schenectady, N.Y.; Allan B. Plunkett, Portland, Oreg.; Robert L. Steigerwald, Scotia, N.Y.

[73] Assignee: General Electric Company, Schenectady, N.Y.

[21] Appl. No.: 615,655

[22] Filed: May 31, 1984

[51] Int. Cl.$^4$ .............................................. H02P 5/40
[52] U.S. Cl. .................................... 318/701; 318/757
[58] Field of Search ............... 318/138, 254, 701, 757, 318/759; 363/135, 136, 137, 138

[56] References Cited

U.S. PATENT DOCUMENTS

| | | | |
|---|---|---|---|
| 3,548,275 | 12/1970 | Inagaki et al. | 318/759 |
| 3,560,820 | 2/1971 | Unnewehr | 318/138 |
| 3,639,818 | 2/1972 | Wiart | 318/759 |
| 3,678,352 | 7/1982 | Bedford | 318/138 |
| 3,679,953 | 7/1972 | Bedford | 318/138 |
| 3,697,839 | 10/1972 | Unnewehr | 318/701 |
| 3,697,840 | 10/1972 | Koch | 318/701 |
| 3,845,379 | 10/1974 | Kawamata | 318/345 F |
| 4,253,053 | 2/1981 | Ray et al. | 318/701 |
| 4,348,619 | 9/1982 | Ray et al. | 318/254 |
| 4,563,619 | 1/1986 | Davis et al. | 318/138 |
| 4,687,851 | 5/1978 | Klautschek | 318/138 |

OTHER PUBLICATIONS

R. M. Davis, W. F. Ray, and R. J. Blake, *Inverter Drive for Switched Reluctance Motor: Circuits and Component Ratings*, IEEE Proc., Mar. 1981.

Primary Examiner—David Smith, Jr.
Attorney, Agent, or Firm—Marvin Snyder; James C. Davis, Jr.

[57] ABSTRACT

In a converter for a switched reluctance motor, a dump capacitor receives freewheeling current from each phase and resupplies the charge to the dc supply. In this manner, residual magnetic energy is recovered and phase current quickly reduced while the converter requires only one main switching device and one freewheeling device per phase and the converter allows a unipolar source to be used.

10 Claims, 11 Drawing Figures

REGENERATIVE UNIPOLAR CONVERTER FOR SWITCHED RELUCTANCE MOTORS USING ONE MAIN SWITCHING DEVICE PER PHASE The present invention relates in general to a method of commutation and a converter circuit for a switched reluctance drive and more specifically to regenerative recovery of residual magnetic energy stored in phase windings at the end of a working stroke of the drive and to quick reduction of phase current to zero after commutation.

BACKGROUND OF THE INVENTION

Switched reluctance motors conventionally have poles or teeth on both the stator and the rotor (i.e. they are doubly salient). There are phase windings on the stator but no windings on the rotor. Each pair of diametrically opposite stator poles is connected in series to form one phase of the switched reluctance motor.

Torque is produced by switching current on in each phase winding in a predetermined sequence that is synchronized with the angular position of the rotor, so that a magnetic force of attraction results between the rotor and stator poles that are approaching each other. The current is switched off in each phase at the commutation point before the rotor poles nearest the stator poles of that phase rotate past the aligned position, otherwise the magnetic force of attraction will produce a negative or braking torque. Quick reduction of the phase current to zero helps avoid negative torque. Co-pending application Ser. No. 612,517, now U.S. Pat. No. 4,500,824, issued Feb. 19, 1985, and assigned to the assignee of the present application, discloses a three stage commutation method for a switched reluctance drive.

The torque developed is independent of the direction of current flow. Unidirectional current pulses synchronized with rotor movement can be generated in a converter using a single unidirectional current switching element such as a thyristor or transistor in each phase.

Each time a phase of the switched reluctance motor is switched on by closing a switch in a converter, current flows in the stator winding, providing energy from a dc supply to the motor. The energy drawn from the supply is converted partly into mechanical energy by causing the rotor to rotate towards a minimum reluctance configuration and partly into a magnetic field. When the switch is opened, part of the stored magnetic energy is converted to mechanical output and the remainder of the energy is preferably returned to the dc source.

In prior art switched reluctance motors, efficiency is reduced because of unrecovered energy in the magnetic field. It is known to recover some of this energy by using a bifilar winding to allow current to return to the dc source after the main switching device turns off. The bifilar winding permits this energy recovery without having recourse to alternative circuits that require two switching devices and two freewheel diodes in each phase. However, bifilar windings have the disadvantages of high cost, poor winding space utilization and a doubling in the number of terminal connections.

It is also known to use a single winding with a bipolar power supply. A bipolar supply is undesirable because the available dc voltage cannot be utilized efficiently and because the base drive and other control circuits have to be supplied through isolation transformers, increasing overall costs.

OBJECTS OF THE INVENTION

It is a principal object of the present invention to provide a new and improved method for commutating a switched reluctance drive which is not subject to the foregoing disadvantages.

It is a further object of the present invention to achieve maximum energy recovery from a switched reluctance drive employing a single switching device and a single freewheel device per phase, with a non-bifilar winding in each phase and a unipolar supply.

It is a further object of the present invention to provide a method for regenerative recovery of the residual magnetic stored energy contained in a phase winding of a switched reluctance drive at the end of a working stroke.

It is another object of the present invention to provide a method to quickly reduce phase current of a switched reluctance drive to zero after the commutation point in order to eliminate negative torque.

It is a further object of the present invention to provide a new and improved converter circuit for recovering magnetic stored energy.

It is yet another object of the present invention to provide a converter circuit for a switched reluctance drive for increasing the decay rate of current in a phase following the commutation point.

SUMMARY OF THE INVENTION

These and other objects are achieved by the disclosed commutation method for a switched reluctance drive and converter circuit therefor, wherein the decay rate of current is increased by transferring freewheeling current to a charge storage device having a voltage greater than the dc source voltage. The charge may then be recovered by selectively bleeding at least a portion of the charge back to the dc source.

A recovery circuit is provided comprising a charge storage device coupled to each phase through a phase unidirectional device. The recovery circuit may also include means for returning charge to the dc source.

The features and advantages of the present invention will become apparent from the following detailed description of the invention when read with the accompanying drawings in which applicable reference numerals have been retained

DETAILED DESCRIPTION OF THE INVENTION

Figure 1:
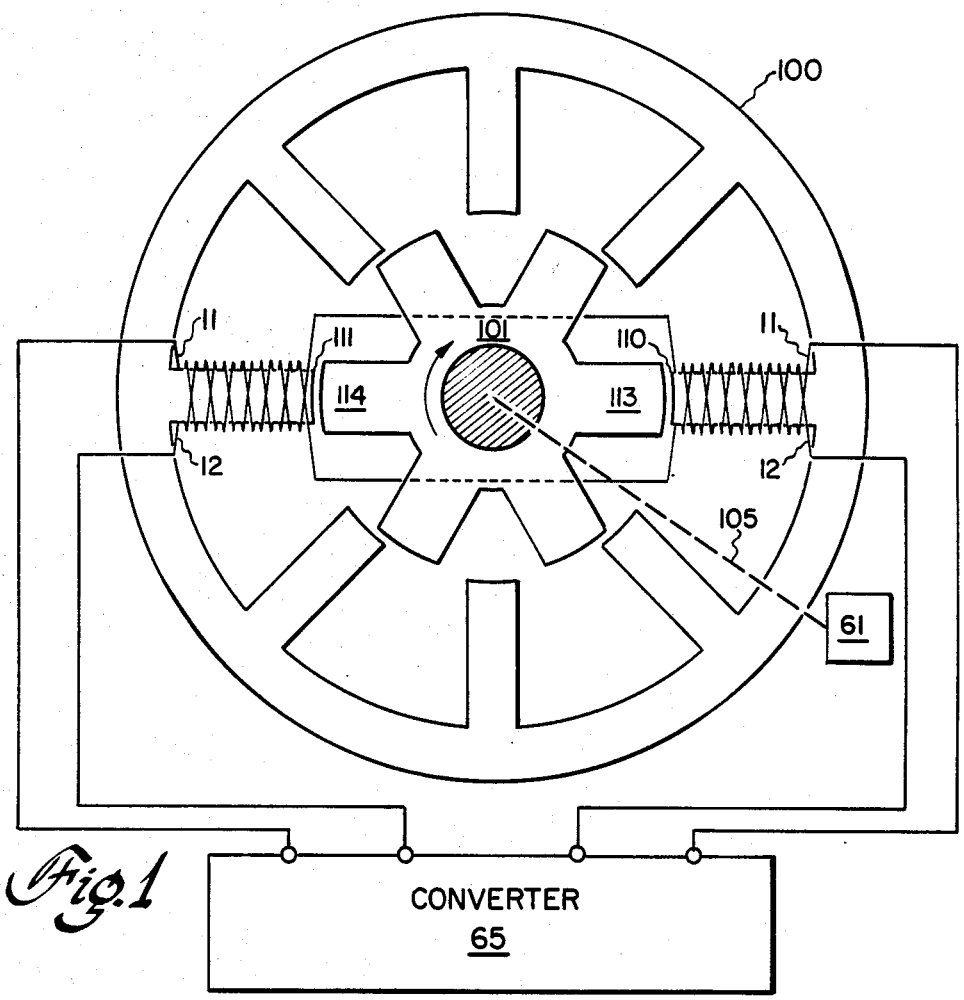
FIG. 1 is an illustration of a conventional switched reluctance drive.

FIG. 1 shows a portion of a switched reluctance motor in cross-section and a converter circuit for one phase of the motor. A laminated iron stator 100 has a plurality of stator pole pairs, including a pair comprised of stator poles 110 and 111. A primary coil 11 and a secondary coil 12 are each wound in series on stator poles 110 and 111. The coils are energized by a converter 65 as known in the art and described with reference to FIG. 3A.

A laminated iron rotor 101 has a plurality of pairs of rotor poles including a pair comprised of rotor poles 113 and 114. Rotor 101 is fastened to a shaft 105 and drives a shaft position sensor 61.

Although the following discussion references only one motor phase, it will be clear that all phases behave identically except that their energization by the converter may be phased by equal increments of rotor rotation.

Figure 3A:
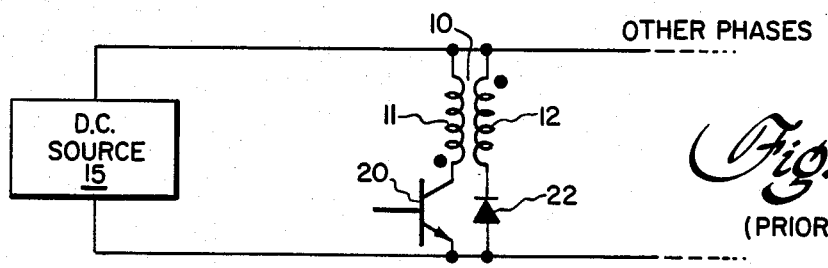
FIGS. 3A and 3B show exemplary prior art converter circuits using only one main switching device per phase.

The converter circuit of FIG. 3A for one phase of the motor shown in FIG. 1 comprises a bifilar winding 10 having primary coil 11 and secondary coil 12 both wound on stator poles 110 and 111 as shown in FIG. 1, wherein an increasing with time positive current entering a dotted terminal of one coil produces an open-circuit voltage across the second coil which is positive at the dotted terminal of the second coil. Secondary coil 12 is connected in series with a diode 22 and a dc source 15, the dc source and the diode being connected in series opposition. The collector of a bipolar transistor 20 is connected to the dotted terminal of coil 11 and the emitter of transistor 20 is connected to the anode of diode 22, while the non-dotted terminal of coil 11 is connected to the dc source 15 and the dotted terminal of coil 12. The base of transistor 20 is connected to a control circuit, not shown.

Figure 2:
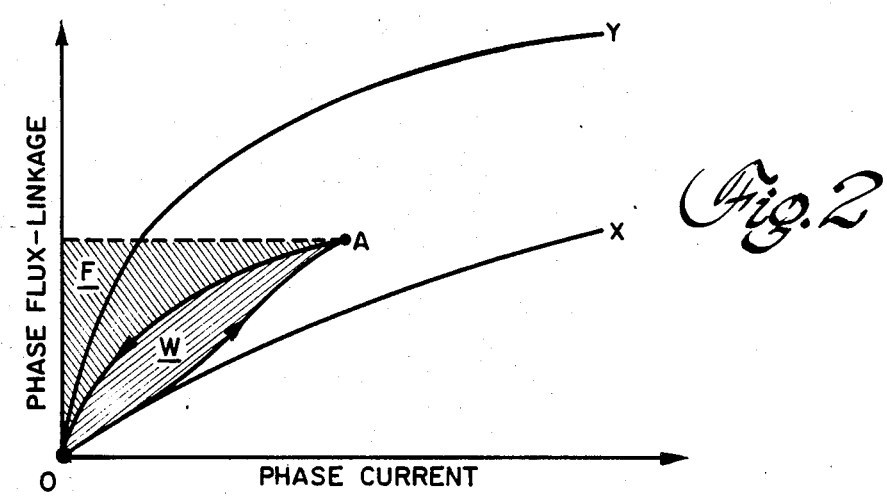
FIG. 2 shows a typical flux-linkage/current trajectory for a phase winding of a conventional switched reluctance drive.

The trajectory of the flux-linkage versus current curve for the converter circuit shown in FIG. 3A is illustrated in FIG. 2. Curves OX and OY represent the magnetization characteristics of one phase of the motor shown in FIG. 1 when the rotor is stationary in the minimum and maximum inductance positions, respectively. Curve OA is the trajectory in a running motor resulting from the flow of current in primary coil 11 of bifilar winding 10 when switching element 20 is conducting. While switching element 20 conducts, unidirectional conduction device 22 prevents current from flowing in secondary coil 12. At commutation point A, current is flowing into primary 11 from dc source 15. At point A, transistor 20 is switched off through circuitry (not shown) connected to the base electrode, in a manner well-known in the art and described below with reference to FIG. 9, interrupting current flow in primary 11. The resulting voltage induced in secondary 12 produces a current flow out of secondary 12 at the dot, which is returned to dc source 15 through forward-connected diode 22. As current and flux-linkage decrease, the flux-linkage versus current curve returns to point 0.

Figure 3B:
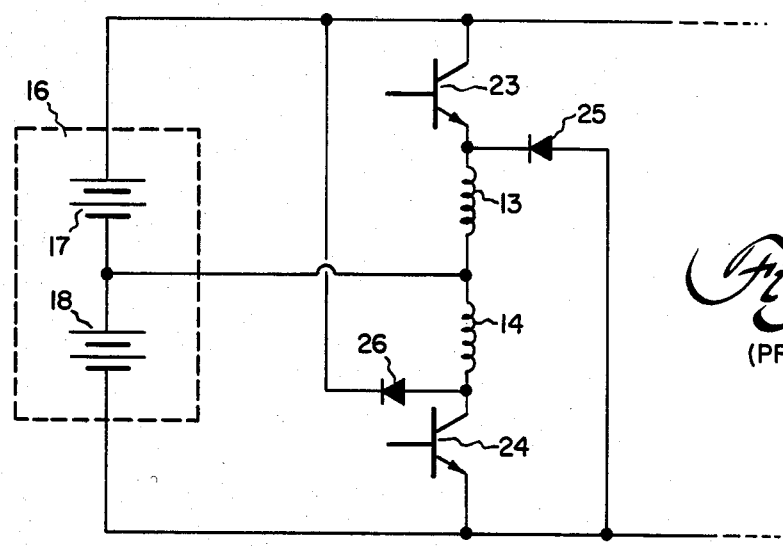

The converter circuit of FIG. 3B comprises two phase windings 13 and 14 and a bipolar dc source 16. The collector of a bipolar transistor 23 is connected to the positive terminal of a first supply portion 17 of bipolar source 16. Phase winding 13 is connected between the emitter of transistor 23 and a junction of the negative terminal of first supply portion 17 and the positive terminal of a second supply portion 18. The emitter of a bipolar transistor 24 is connected to the negative terminal of second supply portion 18. Phase winding 14 is connected between the collector of transistor 24 and the positive terminal of second supply portion 18. A diode 26 connects the collector of transistor 24 to the positive terminal of first supply portion 17. A diode 25 connects the emitter of transistor 23 to the negative terminal of second supply portion 18. Both diodes 25 and 26 are connected in opposition to dc source 16.

Each phase 13 and 14 achieves the same curve trajectory as shown in FIG. 2. The circuit of FIG. 3B differs from the circuit of FIG. 3A in that when a transistor is switched off current still flows in the respective winding, but now it flows through freewheeling diode 24 or 25 into a portion of bipolar dc source 16 other than the one which initially supplied the current.

At commutation point A, using either of the converters in FIG. 3, there is stored in the phase winding magnetic energy equal to the sum of areas F and W, illustrated by cross-hatching in FIG. 2. The size of area W is related to the mechanical output energy of the working stroke, i.e. one traversal of the trajectory. Area F represents the energy which may be recovered and returned to the dc supply. Although the converter circuits shown in FIGS. 3A and 3B recover most of this energy, they suffer from the disadvantages previously discussed.

Figure 4:
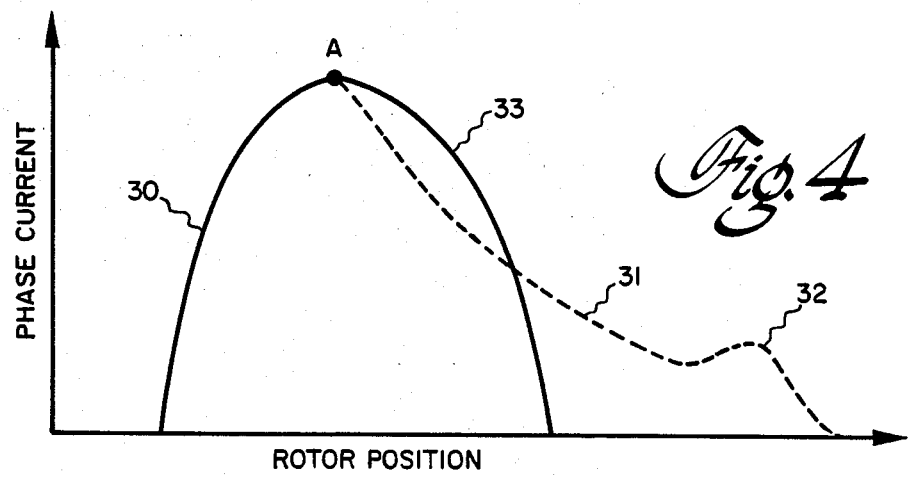
FIG. 4 is a graphic illustration comparing the phase current waveforms of the present invention and the prior art.

A current waveform for the prior art converter circuits of FIG. 3 is shown in FIG. 4. Curve 30 represents the increase of current to commutation point A. Current decay in the prior art converter circuits is shown by curve 31. If this current has not reduced to zero by the time that the rotor poles are aligned with the stator poles, then the rate of change of inductance becomes negative causing an electromotive force which sustains or even increases the phase current. This increase in current, shown as a hump 32 in curve 31, generates even more negative torque.

The improved current decay waveform 33 in FIG. 4 may be achieved by the method of the present invention which avoids generation of negative torque while efficiently recovering residual magnetic energy. The decay rate of phase current after the commutation point is increased so as to quickly bring the phase current to zero by the step of allowing the current to freewheel into a charge storage device which has a voltage higher than the voltage of the dc source either at the time that freewheeling begins or during freewheeling as the freewheeling current increases the voltage in the charge storage device. Recovery of the residual magnetic energy is realized by the further step of selectively bleeding charge stored in the charge storage device back to the dc source.

Figure 5:
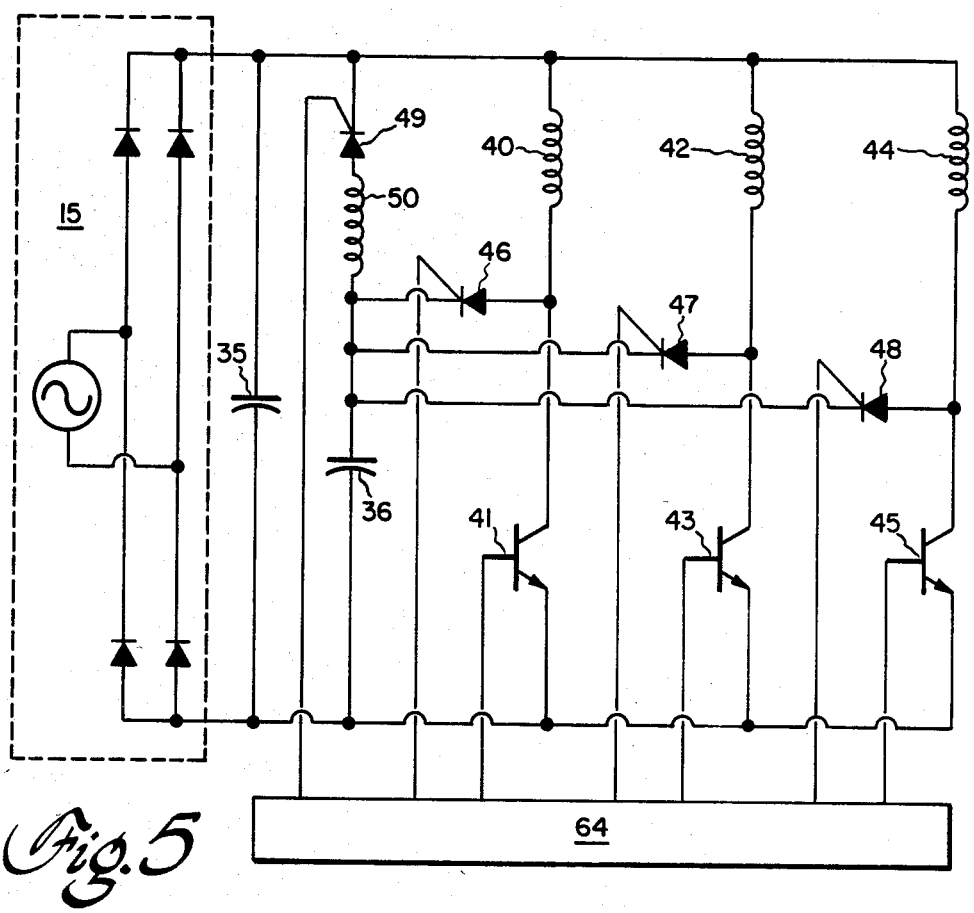
FIG. 5 is an embodiment of the converter circuit of the present invention.

One embodiment of the converter circuit of the present invention, and which generates waveform 33 of FIG. 4, is shown schematically in FIG. 5. Unipolar dc source 15 may be comprised of a full-wave rectified ac source as shown. A dc link capacitor 35 is connected across source 15. Phase windings 40, 42 and 44, respectively, are each connected in series with a transistor 41, 43 and 45, respectively, across dc source 15. The bases of transistors 41, 43 and 45 are connected to a firing pulse generator 64 of the control circuit described more fully below. The emitters of transistors 41, 43 and 45 are connected to the negative terminal of source 15. Transistors 41, 43 and 45 constitute the main switching devices of the converter circuit and may comprise bipolar transistors, FETs, SCRs, insulated gate transistors or gate turn-off thyristors.

The converter circuit further comprises an energy recovery circuit. The charge storage device of the invention is shown, in FIG. 5, as a dump capacitor 36 having a first terminal connected to the negative terminal of source 15. Thyristors 46, 47 and 48, respectively, connect phase windings 40, 42 and 44, respectively, to a second terminal of dump capacitor 36. Each thyristor 46, 47 and 48 has its anode connected to its respective phase winding, its cathode connected to dump capacitor 36, and its gate connected to pulse generator 64. The second terminal of dump capacitor 36 is coupled through an inductor 50 to the anode of a thyristor 49 which has its cathode connected to the positive terminal of source 15 and its gate connected to pulse generator 64.

Since the operation of all phases is identical, the first phase comprised of phase winding 40 and transistor 41 will be considered as a representative example. When transistor 41 switches on, the phase current builds up in the normal way as previously described regarding FIGS. 2 and 3A. When transistor 41 turns off at the commutation point, its associated phase current is allowed to freewheel through thyristor 46 into dump capacitor 36. Thyristor 46 is gated on at the same instant that transistor 41 is turned off or slightly before. All thyristors and transistors are controlled by firing pulse generator 64, described below with reference to FIGS. 9 and 10.

Figure 6:
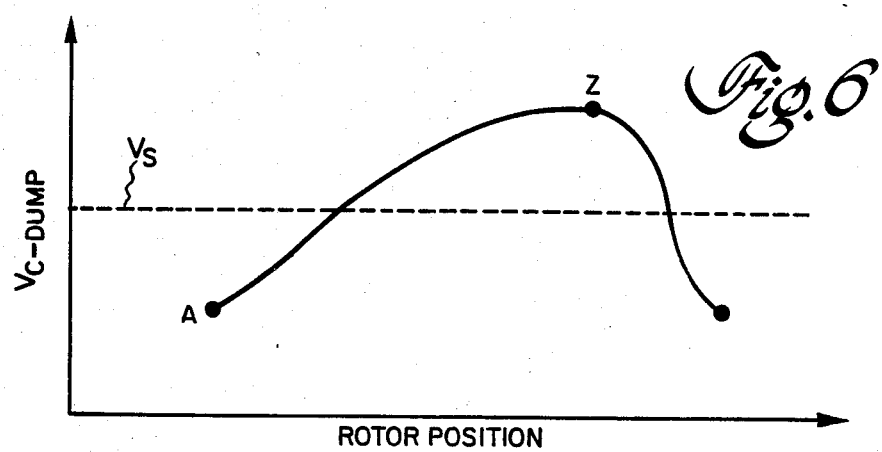
FIG. 6 illustrates the dump capacitor voltage waveform of the converter circuit of FIG. 5.

In the embodiment of FIG. 5, the capacitive value of dump capacitor 36 is chosen such that the freewheeling current charges dump capacitor 36 to a voltage level of about 2 to 3 times the dc source voltage, $V_s$. The capacitive value of link capacitor 35 is 5 to 10 times that value. The resulting voltage waveform of dump capacitor 36 is shown in FIG. 6. At commutation point A, dump capacitor 36 is charged to some voltage less than $V_s$. As the phase current freewheels, the dump capacitor voltage rises. When phase current drops to zero at point Z, the dump capacitor voltage is at a maximum, i.e. 2 to 3 times $V_s$, and thyristor 46 is gated off.

Also at point Z, thyristor 49 is gated on to restore the increased charge on dump capacitor 36 to link capacitor 35. The charge is transferred in a resonant manner in the series resonant loop comprising dump capacitor 36, inductor 50 and link capacitor 35. Thus, the dump capacitor voltage falls to a level well below $V_s$, as shown in FIG. 6. Thyristor 49 is gated off when the resonant current drops to zero. Thyristors 46, 47 and 48 prevent the respective phase windings from conducting as soon as the dump capacitor voltage drops below $V_s$. At this point, dump capacitor 36 is ready to receive freewheeling current from another phase.

Figure 7:
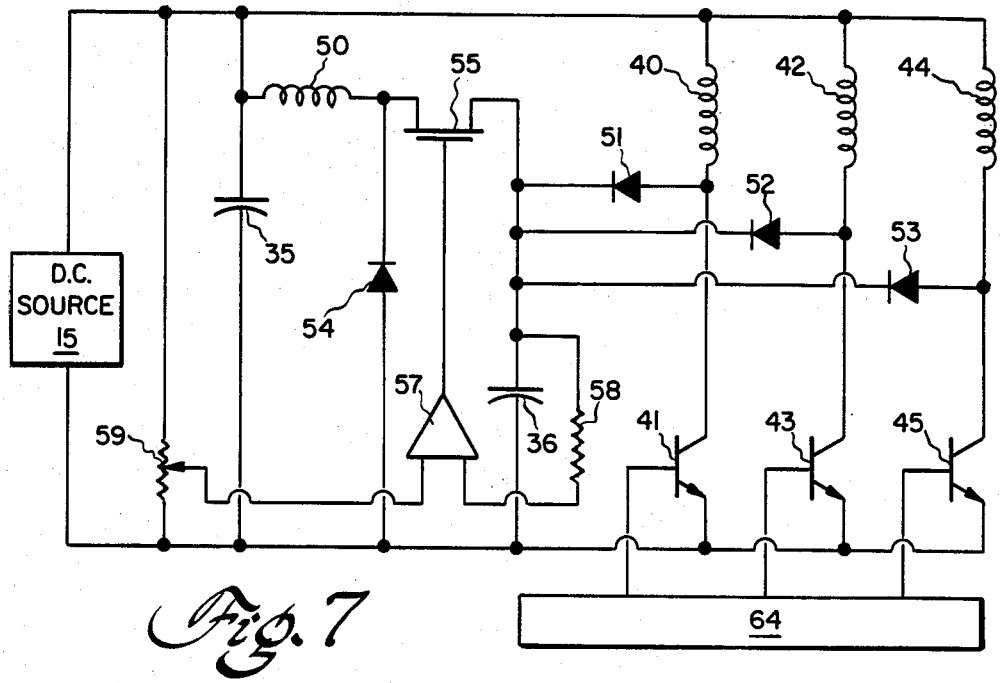
FIG. 7 is another embodiment of the converter circuit of the present invention.

The embodiment of a converter circuit shown in FIG. 7 is a modification of the circuit in FIG. 5. Diodes 51, 52 and 53 connect phase windings 40, 42 and 44, respectively, with dump capacitor 36. A FET 55 has its drain connected to dump capacitor 36, its source connected to inductor 50 and its gate connected to a control comprised of a comparator 57 having a resistor 58 connected to the one input terminal and a potentiometer 59 connected to another input terminal. A diode 54 is also included with its cathode connected to inductor 50 and its anode connected to the negative terminal of dc source 15, as shown.

When the circuit of FIG. 7 is first energized by dc source 15, current flows through each phase winding and its respective diode into dump capacitor 36. The voltage across dump capacitor 36 rises to substantially $2V_s$ due to resonance. Dump capacitor 36 is charged in just a few milliseconds. Diodes 51, 52 and 53 become reverse biased when current flow in phase windings 40, 42 and 44 ceases. Diodes may be used instead of thyristors because the dump capacitor voltage is always greater than $V_s$.

Further operation of the converter of FIG. 7 is similar to the previously described circuit. Freewheeling current charges dump capacitor 36 in the energy recovery circuit. However, instead of having a periodic resonant discharge of dump capacitor 36, a chopper circuit comprising FET 55, inductor 50 and diode 54 is used to bleed excess energy from dump capacitor 36 back to link capacitor 35, maintaining a roughly constant voltage on dump capacitor 36.

When the dump capacitor voltage exceeds a predetermined level (on the order of twice $V_s$ and adjustable through potentiometer 59), FET 55 is turned on by comparator 57 and current flows from dump capacitor 36 through inductor 50 and into link capacitor 35. As the current reaches a maximum, FET 55 turns off, preventing the voltage across dump capacitor 36 from falling below $V_s$ and allowing it to fall only slightly below the predetermined level. After FET 55 turns off, inductor 50 continues to conduct through diode 54 until all of the energy is returned to link capacitor 35, which then makes the energy available to be transformed into useful work. In the meantime, other phases may be freewheeling, supplying more energy to dump capacitor 36.

The advantage in keeping the dump capacitor voltage, $V_{c\text{-}dump}$, greater than $V_s$ lies in the resulting ability to reduce phase current to zero in a shorter time. During freewheeling of phase current into dump capacitor 36

$$d\psi/dt = V_s - V_{c\text{-}dump},$$

where $\psi$ represents phase flux-linkage. According to this relationship, the higher the dump capacitor voltage, the higher the rate of decrease of phase flux-linkage. Thus, the converter circuit as described also achieves rapid extinction of the phase current.

Figure 8:
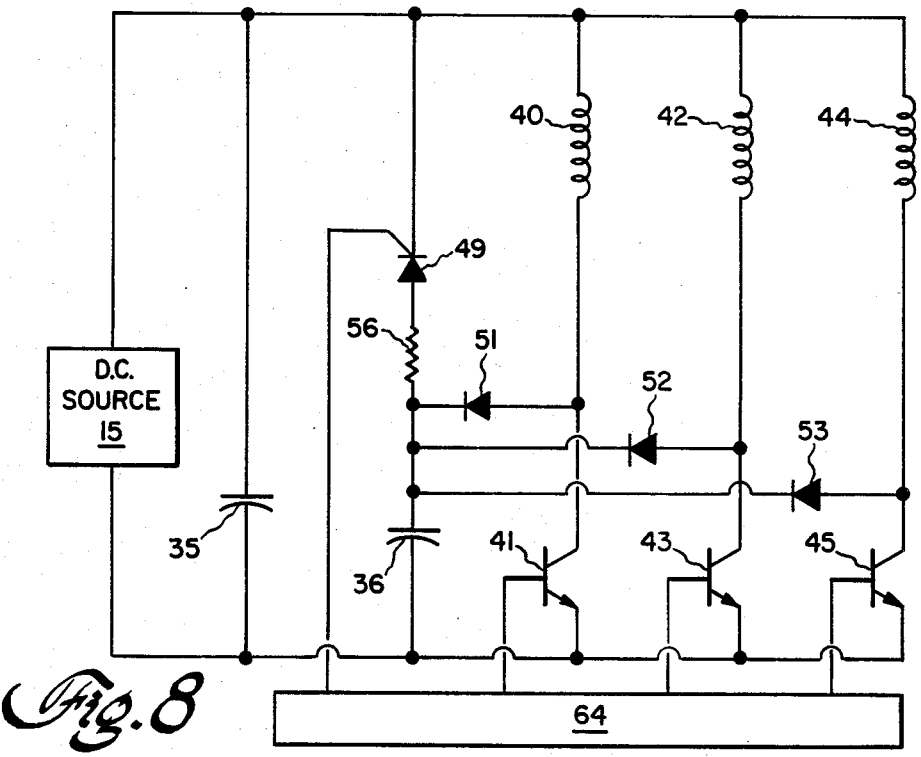
FIG. 8 is yet another embodiment of the converter circuit of the present invention.

A further embodiment of the converter circuit, as shown in FIG. 8, is obtained by replacing inductor 50 in FIG. 5 with a resistor 56 and replacing the thyristors 46, 47 and 48, respectively, in each phase with diodes 51, 52 and 53, respectively. In this case, discharge of dump capacitor 36 through resistor 56 into link capacitor 35 is not resonant. Therefore, $V_{c\text{-}dump}$ remains greater than or equal to $V_s$, allowing diodes to be used in each of the phases. Efficiency is lowered due to power loss in resistor 56, but the cost of the converter is lowered and its control is simplified.

Control of the main switching devices in each phase will be described with reference to FIGS. 9 and 10. It will be apparent to those skilled in the art that the gating signals for the switching transistors or thyristors in the various converter circuit embodiments may be easily derived from the switching signals described below.

Figure 9:
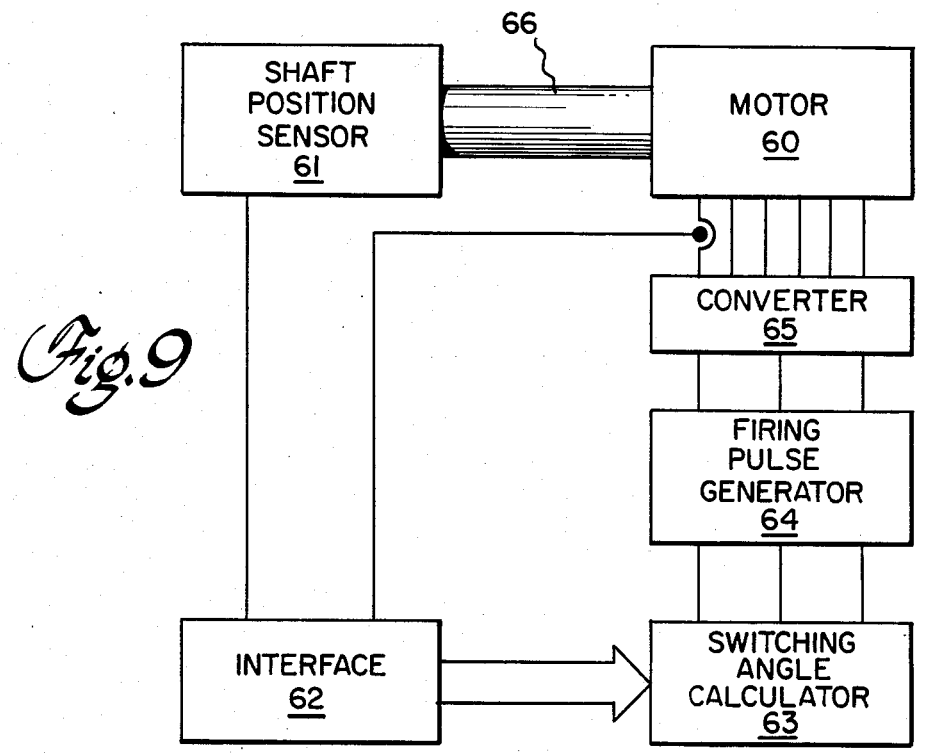
FIG. 9 is a block diagram of a system used to control the converter circuit of the invention.

FIG. 9 is a block diagram of apparatus which senses rotor position, calculates switching angles and generates phase firing signals. The switching angles are calculated at which (1) the main switching device or devices turn on to energized phase windings; and (2) the main device or devices turn off allowing the motor current to freewheel.

The shaft position sensor 61 may be a device mechanically coupled to shaft 105 and which provides a fixed number of electrical pulses with each rotor revolution. The position of the rotor is determined by counting the pulses. An index pulse may be provided so that the absolute position can be ascertained.

Interface circuit 62 is a buffer amplifier which conditions and "squares up" (i.e., reshapes into rectangular form) the pulses from position sensor 61. Typically, circuit 62 may be a Schmitt trigger circuit.

Figure 10:
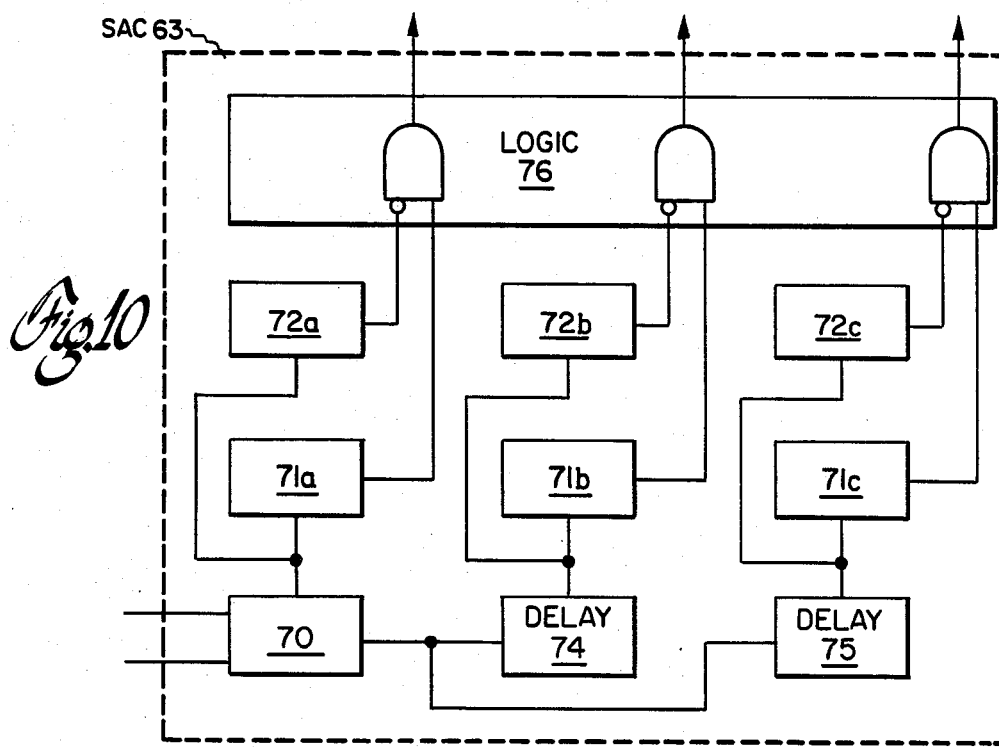
FIG. 10 shows the switching angle calculator of FIG. 9 in greater detail.

Switching angle calculator (SAC) 63, shown in detail in FIG. 10, is comprised of counters that divide down the sensor pulses received from interface 62. For example, if position sensor 61 of FIG. 9 produces 2400 pulses per revolution and the rotor has 6 poles, then a first counter 70 in SAC 63 divides by 400 to obtain 6 rotor position pulses per revolution. Each of these 6 pulses represents a reference pulse associated with a respective rotor pole and is used in resetting a respective one of a plurality of second counters 71a, 71b and 71c each associated with a separate phase, respectively. Each second counter counts down an interval corresponding to the angle through which the rotor is required to move before the respective phase current is switched on. This angle is stored in a memory (not shown), typically a microprocessor based memory. The reset signals for the respective phases coming from the rotor position pulses are delayed by appropriate amounts in delays 74 and 75 corresponding to the angular displacements between the phases, with a single (nonbifilar) motor phase winding in each phase.

Each respective one of a plurality of third counters 72a–72c, each associated with a separate phase, respectively, is reset by the pulses resetting second counters 71a, 71b and 71c, respectively. The third counters count down the intervals corresponding to the angle at which each phase current is switched off. A logic circuit 76 uses pulses from counters 71–72 to control a firing pulse generator 64, shown in FIG. 9. Logic circuit 76 may be an AND gate for each phase with the input from third counters 72a–72c inverted, as shown for one phase in FIG. 10. The process is repeated in each phase at the next occurrence of a rotor position pulse which resets the counters.

In a microprocessor based control scheme the counts that are loaded into the various counters can be stored in memories or registers and their values can be changed at frequent intervals. The microprocessor may be programmed with a strategy that takes into account speed, load and command signals.

Firing pulse generator 64 is a standard type of circuit available as a single field-effect transistor in each phase, which amplifies the logic level signals received from SAC 63 to provide sufficient power to the converter switching devices to turn them on and off, for driving motor 60. In drives of low power (typically less than 100 W) the power amplification provided by firing pulse generator 64 is not necessary and the converter switching devices can be turned on and off directly by logic level signals from SAC 63.

The present invention provides a method of commutation with appropriate converter circuits for a switched reluctance drive. Regenerative recovery of residual magnetic energy and rapid decay of phase current are achieved by causing freewheeling current to charge a dump capacitor and then selectively bleeding the stored charge back to the dc source. This is accomplished with a unipolar dc source, nonbifilar windings and only one main switching device per phase.

While preferred embodiments of the present invention have been shown and described herein, it will be obvious to those skilled in the art that such embodiments are provided by way of example only. Numerous variations, changes, departures, substitutions and partial and full equivalents will now occur to those skilled in the art without departing from the invention. Accordingly, it is intended that the invention be limited only by the spirit and scope of the appended claims.

What is claimed is:

1. A converter for a phase winding of a variable reluctance drive, said winding having a first side for connecting to the positive terminal of a dc source, said converter comprising:

a phase switch for coupling a second side of said phase winding to the negative terminal of said dc source when said phase switch is conducting;

a phase unidirectional conducting device having its anode coupled to said second side of said phase winding so as to carry freewheeling current from said phase winding after said phase switch turns off;

a capacitor having one side coupled to the cathode of said phase unidirectional conducting device, said capacitor adapted to be charged by said freewheeling current to a voltage in excess of the dc source voltage; and bleed means coupling said one side of said capacitor to said positive terminal of said dc source for bleeding at least a portion of the charge on said capacitor back to said positive terminal when the voltage across said capacitor rises to a predetermined value.

2. The converter of claim 1 wherein said bleed means comprises:

a chopper switching element having a first side connected to said one side of said capacitor;

a chopper diode having its cathode coupled to a second side of said chopper switching element and having its anode coupled to said negative terminal;

an inductor coupled between said second side of said chopper switching element and said positive terminal; and chopper control means coupled to said chopper switching element and to said capacitor for turning on said chopper switching element when the voltage across said capacitor rises to said predetermined value and for turning off said chopper switching element before the voltage across said capacitor falls below the level of the dc source voltage.

3. The converter of claim 2 wherein said predetermined value is about twice said dc source voltage.

4. A converter for a multiphase variable reluctance drive, said drive including a plurality of phase windings, each phase winding having a first side for connecting to the positive terminal of a dc source, said converter comprising:

a plurality of phase switches, each phase switch, respectively, coupling a second side of a respective phase winding to the negative terminal of said dc source when each respective phase switch is conducting;

a plurality of phase unidirectional conducting devices, each unidirectional conducting device, respectively, having its anode coupled to the second side of a respective phase winding so as to carry freewheeling current from its respective phase winding after the respective phase switch turns off;

a capacitor having one side coupled to the cathode of each of said plurality of unidirectional conducting devices, said capacitor adapted to be charged by said freewheeling currents; and bleed means coupling said one side of said capacitor to said positive terminal of said dc source for bleeding at least a portion of the charge on said capacitor back to said positive terminal when the voltage across said capacitor rises to a predetermined value.

5. The converter of claim 4 wherein said bleed means comprises:

a chopper switching element having a first side coupled to said one side of said capacitor;

a chopper diode having its cathode coupled to a second side of said chopper switching element and having its anode coupled to said negative terminal;

an inductor coupled between said second side of said chopper switching element and said positive terminal; and chopper control means coupled to said chopper switching element and to said capacitor for turning on said chopper switching element when the voltage across said capacitor rises to said predetermined value and for turning off said chopper switching element before the voltage across said capacitor falls below the level of the dc source voltage.

6. The converter of claim 5 wherein said predetermined value is about twice said dc source voltage.

7. The converter of claim 5 wherein said chopper switching element comprises an FET with its drain and source being said first and second sides of said switching element, respectively, wherein said converter further comprises a voltage divider connected across said dc source, and wherein said chopper control means comprises a comparator with one input comprising the coupling to said capacitor and another input being coupled to the output of said voltage divider, the output of said comparator being coupled to the gate of said FET.

8. The converter of claim 4 wherein said phase unidirectional conducting device comprises a diode.

9. A method for recovering energy released from a phase winding of a switched reluctance drive during freewheeling of said phase winding after the commutation point, said phase winding being connected to a dc source, said method comprising the steps of:

(1) transferring the charge released from said phase winding during freewheeling to a charge storage device; and (2) selectively bleeding at least a portion of the charge in said storage device back to said dc source, said bleeding step being terminated before the voltage across said storage device falls below the voltage across said dc source.

10. A method for recovering energy released from a phase winding of a switched reluctance drive during freewheeling of said phase winding after the commutation point, said phase winding being connected to a dc source, said method comprising the steps of:

(1) transferring the charge released from said phase winding during freewheeling to a charge storage device; and (2) selectively bleeding at least a portion of the charge in said storage device back to said dc source, said bleeding step being initiated when the voltage across said storage device is greater than the voltage across said dc source.

* * * * *